United States Patent [19]

Livits

[11] Patent Number: 5,661,505
[45] Date of Patent: Aug. 26, 1997

[54] SINGLE HAND-CONTROLLED COMPUTER INPUT DEVICE

[76] Inventor: Eric A. Livits, 97-03 71st Ave., Forest Hills, N.Y. 11375

[21] Appl. No.: 372,597

[22] Filed: Jan. 13, 1995

[51] Int. Cl.⁶ ............................................. G09G 5/00
[52] U.S. Cl. ...................... 345/169; 345/168; 345/167; 345/157
[58] Field of Search ............................ 345/157, 163, 345/167, 168, 169; 341/15, 22; 400/472, 489; 361/680

[56] References Cited

U.S. PATENT DOCUMENTS

| | | |
|---|---|---|
| 3,967,273 | 6/1976 | Knowlton . |
| 4,180,337 | 12/1979 | Otey, III et al. . |
| 4,846,598 | 7/1989 | Livits ................................... 400/472 |
| 4,911,565 | 3/1990 | Ryan . |
| 4,913,573 | 4/1990 | Retter . |
| 4,917,516 | 4/1990 | Retter . |
| 4,971,465 | 11/1990 | Hashimoto . |
| 5,006,001 | 4/1991 | Vulcano . |
| 5,021,771 | 6/1991 | Lachman ............................... 345/157 |
| 5,059,048 | 10/1991 | Sirkin . |
| 5,087,910 | 2/1992 | Guyot-Sionnest . |
| 5,161,760 | 11/1992 | Terbrack ............................... 345/168 |
| 5,186,555 | 2/1993 | Chiba . |
| 5,197,811 | 3/1993 | Levinrad . |
| 5,253,160 | 10/1993 | Lin ........................................ 345/163 |
| 5,269,004 | 12/1993 | Comerford et al. ................... 345/168 |
| 5,288,158 | 2/1994 | Matias . |
| 5,291,133 | 3/1994 | Gokhale et al. ...................... 341/15 |
| 5,298,919 | 3/1994 | Chang .................................. 345/167 |
| 5,426,449 | 6/1995 | Danziger .............................. 345/168 |
| 5,430,511 | 7/1995 | Paff et al. ............................. 341/22 |

Primary Examiner—Richard Hjerpe
Assistant Examiner—Kent Chang
Attorney, Agent, or Firm—Lackenbach Siegel Marzullo & Aronson

[57] ABSTRACT

A single-hand controlled computer input device can be used as a keyboard or a pointing device. When used as a keyboard, a housing is mounted for rocking movements between three stable positions, including two angular end positions and one intermediate position midway between the end positions. Stability in the intermediate position is provided by resting the housing of the keyboard on two spaced stable elements, each of which serves as a separate axis for pivoting the housing to one of the angular end positions. Characters, numerals, symbols and functions may be selected using one hand by initially pre-selective rocking of the housing by movement of the hand to one of the stable positions to enable an associated actuator switch and subsequently actuating at least one of the multi-function keys on the keyboard by contact of a key with a tip of the user's finger. The housing may be supported on a working support surface or can be mounted for rocking on a stationary base. The multi-function keys may include mechanical switches, optical sensors or a pointing device.

21 Claims, 8 Drawing Sheets

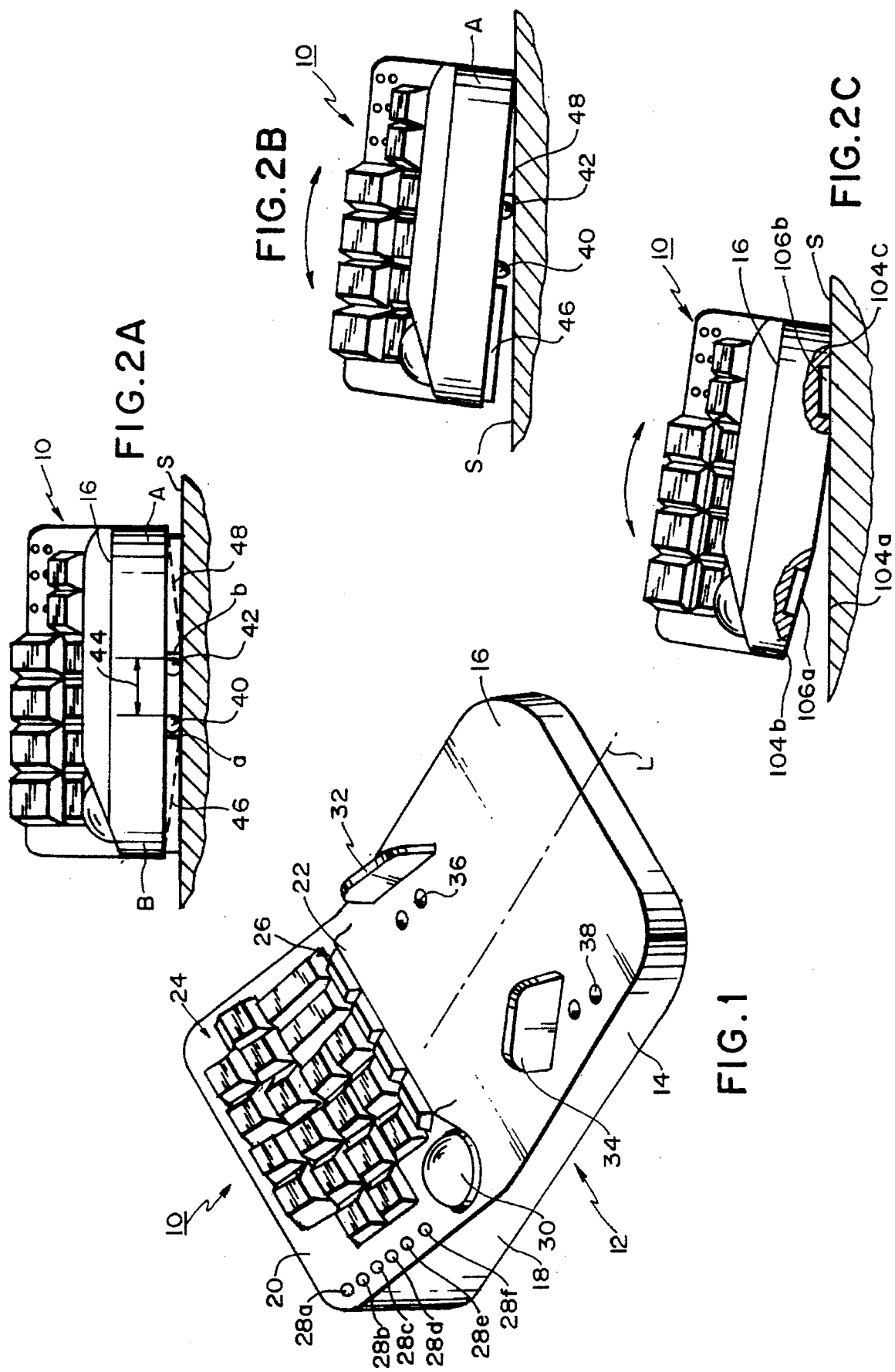

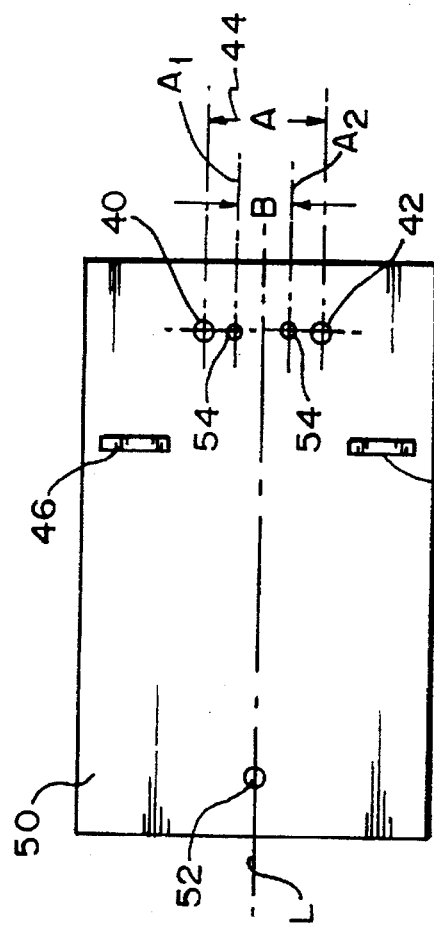
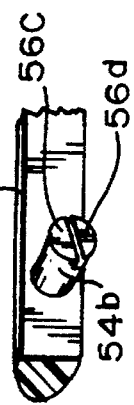
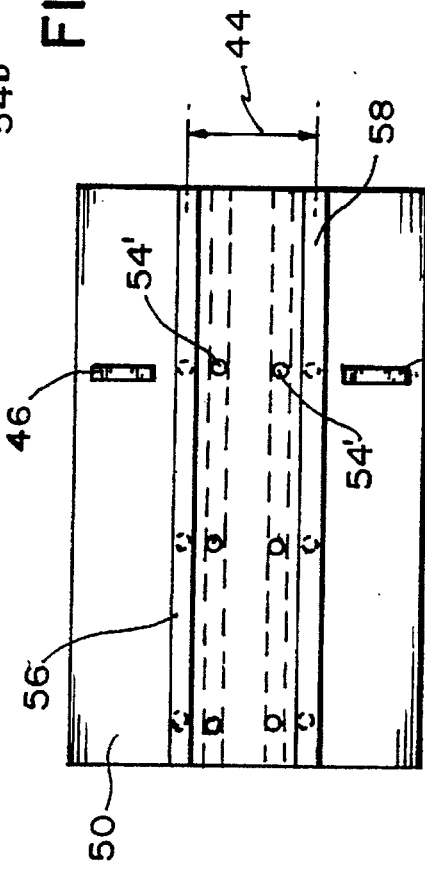
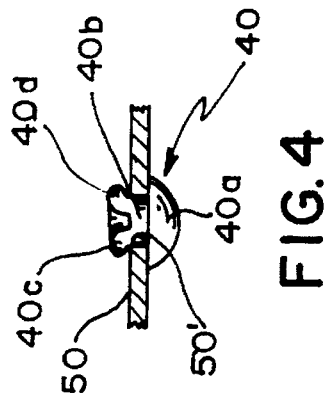
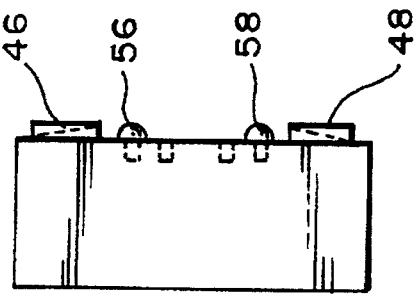

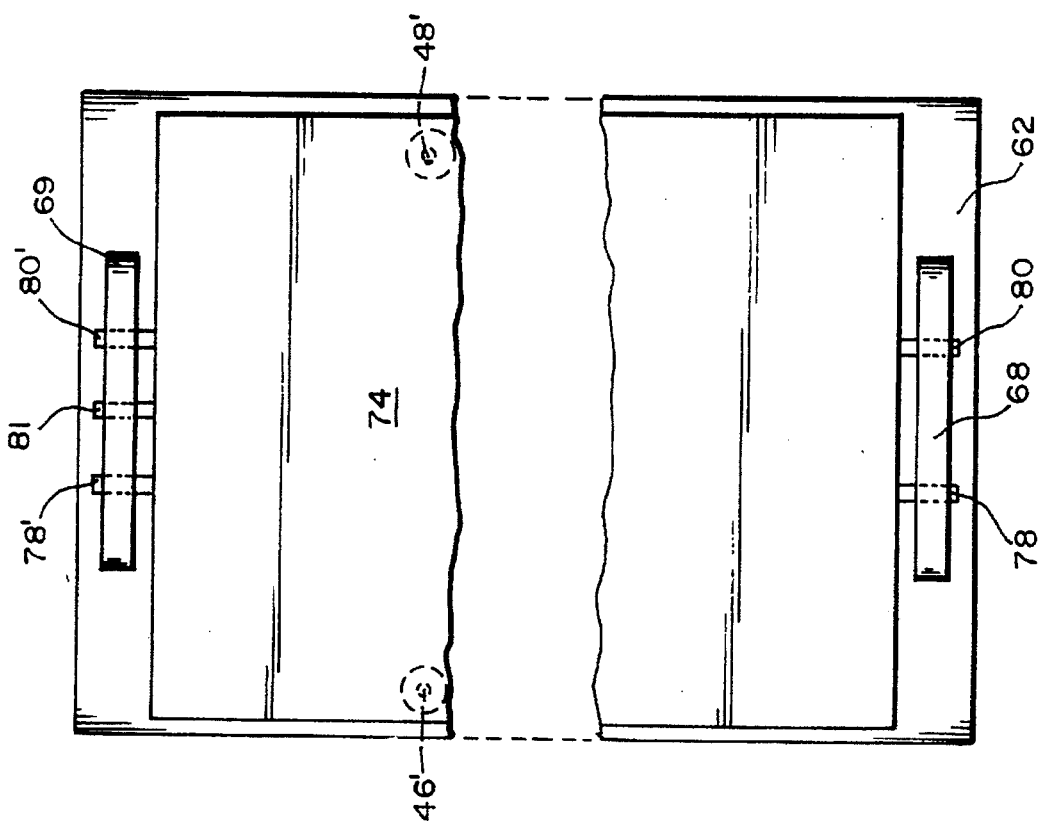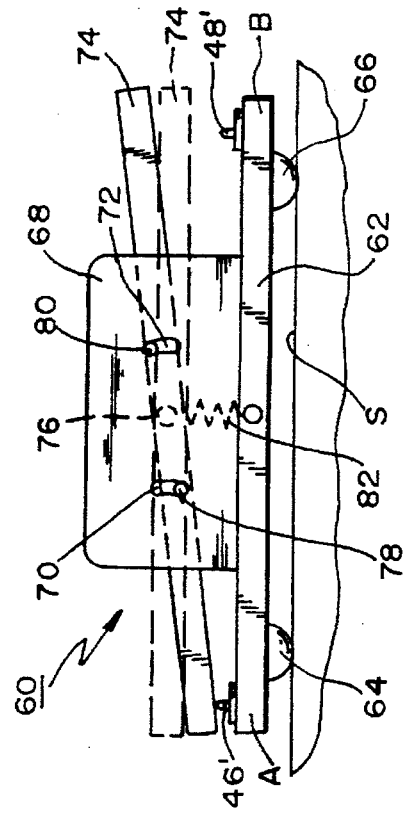

SINGLE HAND-CONTROLLED COMPUTER INPUT DEVICE

BACKGROUND OF THE INVENTION

1. Field of the Invention

The present invention generally relates to computer input devices, and more specifically, to a single or one hand-controlled computer input device.

2. Description of the Prior Art

In order for computers to process data and run computer programs, it is essential that the computer user input data to the computer or commands which designate specific functions to be carried out by the computer. Numerous input devices are well known, including keyboards, "mice", track balls, joy sticks and the like. Generally, keyboards can enter data as well as function commands, while mice, trackballs and joy sticks are most often employed for inputting functional commands.

Most keyboards, including the "QWERTY" keyboard, are desired to be operated by both hands of the user or data operator. A number of one-handed keyboards have, however, been proposed. For example, in U.S. Pat. No. 4,846,598 a one-handed keyboard is disclosed which issued to Applicant of the instant application. The keyboard disclosed in this patent includes a stationary base and a rocking keyboard which is mounted for rocking movements between a normal level position and right and left tilt positions. Clusters of keys are mounted on the rocking keyboard, each of which is a multi-function key representing a plurality of alpha-numeric characters and/or symbols that can be typed or entered by selective actuation of the character keys. The rocking of the keyboard, however, always required a separate base or platform. Additionally, the keyboard did not provide tactile feedback to the user to indicate when the user was in each of the operative positive for selecting a desired character or function.

Other one-handed keyboard designs have also been proposed. Such a device, for example, is disclosed is U.S. Pat. No. 4,725,845 to Lloyd. This patent discloses a typewriter which can be worn in the person's arm and operated by the other arm. A hand-held battery input device is also disclosed in IBM Technical Disclosure Bulletin, Vol. 26, No. 11, April 1984, which is in the nature of a pistol-grip hand-held device. In Siebel et al., U.S. Pat. No. 3,022,878, a communication device is disclosed wherein each finger of the user's hand is engaged with a separate multi-position switch. By moving the tips of each of the individual fingers, therefore, different codes or characters can be generated. In International Publication No. WO82/01345 of Croczynski, a hand-bound keyboard is disclosed which is actuatable by the fingers of the operator. The keyboard may be actuated without any hand or arm movement of the operator, means being provided for mobilizing the keyboard with respect to the palm and back of the hand, while allowing the fingers freedom to move. Each key is arranged so as to be actuated by a single finger. An illustration of this art is German Patent No. 308 048 to Mamerow. The device in the aforementioned German Patent is a hand-held multi-key device which can be selectively actuated by the five fingers of the hand. No movements of the hand are involved.

Simplified keyboards have been disclosed which utilize a handrest to provide the user with a place to rest his or her hands during typing. Such keyboards are disclosed in U.S. Pat. Nos. 4,081,068 and 4,201,489 to Zapp. In these patents, a handrest is disclosed for the ball of the thumb or wrist of the hand, in which the hand of the operator can rest continuously to support his hand during actuation of the keyboard. Means are provided for adjusting the positions of the handrests to dispose the finger tips of the fingers' natural positions in relation to the keys to be actuated, without being tensioned.

Some more recent one-handed keyboard designs include U.S. Pat. Nos. 4,913,573 and 4,917,516 to Retter, in which the keyboard includes a stationary base provided with a series of cavities and raised portions in which and on which keys are mounted, the intention being to require minimal finger movements to actuate any key by the fingers of one hand.

U.S. Pat. No. 4,971,465 to Hashimo discloses a keyboard for use in an information processing device, the keyboard including a plurality of keys arranged in a fixed keyboard base so as to be opposite the finger tips of the operator's hands in a naturally spread state and each having switching contacts to selectively engage by moving the operator's fingers. The intention is to impart numerous key signals with a simple operation.

U.S. Pat. No. 5,087,910 to Guyot-Siownest discloses an electronic keyboard for one-hand operation in which two keys are associated of each finger other than the thumb and separate multi-functions key is associated with the thumb, each key associated with the finger of the hand other than the thumb being adapted to assume three different states in response to the position of the finger, while the thumb key can assume five different states in response to the position of the thumb. The keyboard according to this patent, is a fixed keyboard which depends solely upon the movements of the keys and not movements of the keyboard housing per se.

U.S. Pat. No. 5,059,048 to Sirkin discloses a keyboard for use with one hand which includes cover linear as well as linear rows of keys that are arranged in un-alphabetic order. The keyboard contains at least four vertical columns of keys and at least six horizontal rows of keys, at least eleven multiple entry keys and at least three command keys. As with the previous patent, the keyboard itself remains stationary or fixed during use and only the keys themselves are actuated.

A one-handed keyboard is also disclosed in U.S. Pat. No. 5,288,158 to Matias in which a plurality of keys are mounted on a stationary base or housing. The keyboard is designed to represent one half of a standard keyboard so that a pair of characters are represented by each key of the disclosed keyboard. A modifier key is provided for controlling in which half of the keyboard is to be used in any given instance.

Other proposed one-handed keyboards are disclosed in U.S. Pat. Nos. 4,791,408; 4,201,489; 4,081,068; and 4,042,777.

Thus, while the prior art has disclosed multi-function keyboards and small hand-held or single hand devices, only U.S. Pat. No. 4,846,598 discloses a one-handed keyboard that provides a substantial number of alpha-numeric characters, symbols, and/or functions which are accessible by five fingers of a single hand of a user. However, the aforementioned keyboard disclosed in Applicant's aforementioned patent, is intended to rock between a stable, neutral, central or intermediate position and to angular end positions by rocking the keyboard about one or two axes. The earlier keyboard, however, did not provide a tactile feedback to the user to provide an indication when the keyboard was centered over the neutral position.

SUMMARY OF THE INVENTION

The object of the present invention, therefore, is to provide an improved keyboard over the one disclosed in Applicant's earlier issued U.S. Pat. No. 4,846,598.

It is another object of the present invention to provide a rocking keyboard which can be provided with or without a stationary base.

It is still another objection of the present invention to provide a one-handed keyboard of the type aforementioned which is simple in construction and economical to manufacture.

It is yet another object of the present invention to provide a one-handed keyboard which is relatively simple and comfortable to use, and provides tactile feedback to the user when the keyboard is in each of a number of stable positions in which desired characters, symbols and/or functions may be selected.

It is yet a further object of the present invention to provide a rocking keyboard-type construction which can incorporate a track ball and which can itself serve as a track ball for inputting data to a computer.

In order to achieve the above objects, as well as others which will become apparent hereafter, a single-hand controlled input device comprises a movable housing having remote and proximate portions relative to the position of the user of the input device. Said proximate portion forms a hand supporting surface suitable for the placement of the palm of the user and defines a longitudinal reference line generally parallel to the direction of the hand and fingers of the user when the hand is supported on said proximate portion during use of the input device. Moving means is provided for moving said housing between three stable positions including two end positions and one intermediate position relative to said reference line and for normally maintaining said housing in said stable intermediate position substantially midway between said two end positions. At least one finger-actuated multi-function means is provided on said remote portion which is capable of selectively generating one of a number of different signals to be inputted to a computer upon actuation by a finger of a user. Hand-actuated selector switch means is provided for selecting one of the functions in associated signals of selected multi-function means for each of said stable positions of said housing.

While lateral linear movements in relation to the reference line is possible, in accordance with the presently preferred embodiment, said moving means comprises rocking means for rocking said housing about at least one pivot axis between two angular end positions relative to said pivot axis and for normally maintaining said housing in a generally stable position substantially midway between said two angular end positions. Said hand-actuated selector switch means selects one of the functions and associated signals for each of said angular positions of said movable housing about said axis.

The input device, in accordance with the present invention, can, for example, comprise a one-handed keyboard and/or a track ball.

BRIEF DESCRIPTION OF THE DRAWINGS

The foregoing and other advantages of the present invention will become apparent from the ensuing disclosure in which a preferred embodiment of the invention is described in detail and illustrated in the accompanying drawings wherein:

FIG. 1 is a perspective view of a rocking keyboard in accordance with the present invention which employs a track ball to select functions;

FIG. 2A is a front elevational view of a keyboard similar to the one shown in FIG. 1, illustrating the details of the supporting legs of a keyboard, as well as the switches which are activated during the rocking of the keyboard;

FIG. 2B is similar to FIG. 2A but showing the keyboard rocked in a clockwise direction to activate a switch on the right side of the keyboard;

FIG. 2C is similar to FIG. 2B, but shows an alternate embodiment in which the switches underneath the keyboard responsive to rocking movements on a support surface are replaced by optical sensors;

FIG. 3 is a bottom view of the keyboard shown in FIGS. 1-2A and 2B, illustrating one form of protuberance which facilitates rocking of the keyboard, and an adjusting arrangement for moving the protuberances;

FIG. 4 is cross-section of one of the protuberances shown in FIG. 3, taken along the line of 4—4;

FIG. 5 is similar to FIG. 3, but illustrating a different form or construction of the protuberances;

FIG. 6 is an end elevational view of the keyboard shown in FIG. 5;

FIG. 7 is a perspective view of a section of the protuberance as shown in FIG. 5 which illustrates the details of fasteners for securing the protuberances to the bottom wall of the keyboard;

FIG. 8 is a diagrammatic view, in front elevation, of a one-hand controlled computer input device in accordance with the present invention, which is mounted on a stationary or fixed base or platform;

FIG. 8A is an enlarged and fragmented top plan view of the device shown in FIG. 8;

FIG. 9 is similar to FIG. 8, but illustrates a different construction for providing stability in the central or neutral position of the device;

DESCRIPTION OF THE PREFERRED EMBODIMENTS

Figure 10:
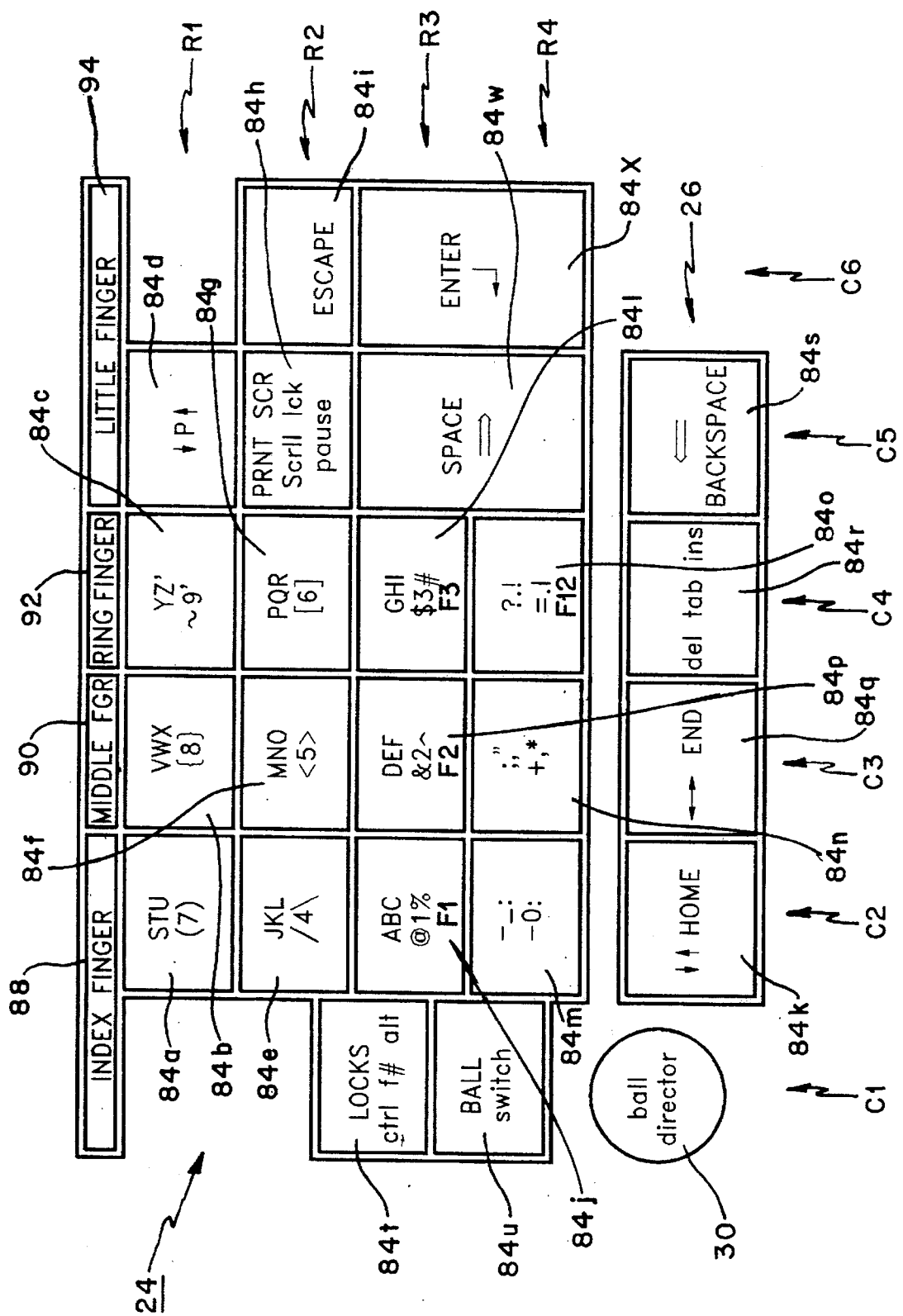
FIG. 10 is a diagrammatic view of the key layout employed on the keyboard shown in FIG. 1, illustrating the characters and/or functions associated with each of the keys on the keyboard.

Referring now specifically to the Figures, identical or similar parts are designated by the same reference numerals throughout. Referring to FIG. 1, a single-hand controlled computer input device in accordance with the present invention is generally designated by the reference numeral 10. While most of the input devices which are disclosed herein are generally in the form of one-handed keyboards, it will be appreciated that the present invention contemplates other input devices that are advantageously manipulated with one hand, such as a mouse, a track ball, game controller, and the like.

In the presently preferred embodiment of a one-handed keyboard, the keyboard 10 includes a rectangular housing as shown, although the specific configuration of the housing is not critical. The housing 12 has a proximate hand supporting portion 14 which defines a generally horizontal hand-supporting surface 16 upon which the user may place the palm of his or her hand. The housing also forms a remote portion 18 which preferably has the specific design illustrated, and includes a first inclined surface 20 facing the user, and an upwardly sloping surface 22 facing the direction away from the user. The inclined surfaces 20,22 define a generally V-shaped configuration. A primary keyboard cluster 24 is provided on the inclined surface 20, while a secondary keyboard cluster 26 is mounted on the surface 22, both clusters being readily accessible and actuatable by the extended or bent fingers of the user. The keyboard clusters 24, 26 are finger-actuated multi-function means and include character keys, each of which represents a plurality of alpha-numerical characters and/or symbols that can be inputted to a computer by a initial pre-selective rocking movements of the housing 12 by the movements of one hand to actuate the keyboard, as to be more fully described, and subsequent selective actuation of one of the capped keys by movements of the fingers. At least some of the keys of the clusters 24, 26 are also function keys on the housing, actuatable by the fingers of the user, each of such function keys representing a plurality of functions that can be inputted to a computer by initial pre-selective rocking movements of the housing by movements of one hand and subsequent selective actuation of at least one of the function keys by movement of the fingers.

The housing 18 and the hand supporting portion of 14 in particular, define a longitudinal reference line L generally parallel to the direction of the hand and the fingers of the user when the hand is supported on the hand supporting portion 14 during normal use of the device. In addition to the primary keyboard 24, there is also provided on the inclined surface 20 a cluster of indicators 28a–28f, which may be in the form of LEDs, to provide indications of various functions or selected keys or key groups on the keyboard, as is typically done in connection with conventional keyboards. Also, in the embodiment shown in FIG. 1 and 2, a track ball 30 is mounted in the region where the inclined surface 20 meets the hand-supporting surface 16 and positioned to be easily manipulatable by the thumb of the user. As will be more fully discussed below, the track ball 30 can be used both as a cursor pointing device or can be used to select a particular alpha-numeric symbols on the multi-function keys.

One aspect of the design is the provision of right and left hand retainers or braces 32 and 34 respectively which maintain the hand of the user in a selected position for minimizing movements on the surface 16 relative to a selected optimum position notwithstanding the pivoting or rocking movements of the keyboard and other movements of the hand in manipulating the various keys. In order to accommodate different sizes of the hands of different users, suitable position adjustment means is provided for moving and fixing the retainers 32, 34 at a plurality of relative positions on the surface 16. One method of achieving this is to provide openings 36, 38 in the surface 16 which can be used to receive downwardly extending posts, stems or posts securing attached to the retainers. As will be clear to those skilled in the art, the retainers can be selectively moved to accommodate the size of the hand of the user as well as to optimize the comfort to such user.

An important feature of the present invention is the provision of moving means for moving the housing 12 between three stable positions including two end positions and one intermediate position relative to the reference line L and for normally maintaining the housing 12 in a stable intermediate position substantially mid-way between the two end positions. In one embodiment (e.g., FIGS. 1, 2A, 2B and 3–7) such moving means may be in the form of two spaced protuberances 40, 42 on the bottom wall 50 or the opposing surface from the upper surface 16, each protuberance 40, 42 defining elongate pivoting axes A1, A2 extending generally along and parallel to the direction of the reference line L and generally equally offset from the reference line. Each protuberance or pivoting element 40, 42 forming such pivoting point may be in the form shown in FIG. 4, as including a head of a semi-spherical configuration 40a provided with a shank 40b dimensioned to be received with an opening hole 50 prime in the bottom wall 50. The end of the shank is formed with somewhat flexible projections which must be forced into the hole 50' and retain the head and shank position as shown once forced through the bottom wall 50. A single protuberance 52 or a pair of corresponding protuberances may be formed at the opposite end of the bottom wall 50 remote from where the primary pivoting elements 40, 42. It will be clear from FIGS. 2A, 2B, and 3 that the spacing 44(A) between the pivoting elements 40, 42 determines how stable the housing 12 is in the neutral or intermediate position, when the keyboard is supported by both such pivoting elements. The smaller the spacing 44, the less stable the keyboard in the intermediate position. Advantageously, the keyboard 10 is provided with a plurality of holes 54, as best shown in FIG. 3, which permit the pivoting elements 40,42 to be adjustably spaced between smaller (B) spacings 44' and larger (A) spacings 44', to provide varying degrees Of stability to best suit the comfort of the user. Any number of adjustment positions 54, or levels of adjustment may be provided.

Referring to FIG. 2A, it will be clear that the keyboard 10 may be mounted or placed on any supporting surface 5 and the keyboard will normally, during the "rest" condition when no rocking forces are applied be supported on the pivoting elements 40, 42. However, by applying a sufficiently great counter-clockwise force, the entire keyboard 10 will pivot about the pivoting about the pivoting element 42 (FIG. 2B) so as to bring side A of the keyboard proximate to the supporting surfaces. Similarly, a sufficiently large counter-clockwise force or moment on the keyboard will cause the keyboard to pivot about the pivoting element 40 to bring side B proximate to the supporting surfaces.

Hand actuated selector switch means is provided for selecting one of the functions and associated signals of a selected key for each of the stable positions of the housing 12 relative to the reference line L. In the embodiment shown in FIGS. 1–3, such selector switch means is in the form of two selector switches 46, 48 which are mounted on opposing surfaces laterally exteriorly of the associated protuberances which is actuated when the housing 12 is pivoted as suggested. Thus, as viewed in FIG. 2B, when the keyboard 10 is pivoted in a counter-clockwise direction, the left selector switch 46 is ultimately actuated. The same is true for the fight selector switch 48 when the keyboard is pivoted in the clockwise direction. Of course, when the keyboard is in its neutral or mediate position (FIG. 2A), neither one of the switches 46, 48 is actuated. These switches are also shown in FIG. 3.

Numerous other pivoting arrangements may be used. Thus, referring to FIG. 5–7, the bottom wall 50 is shown provided with a different form of pivoting elements. Instead of button-type pivoting elements 40,42, rods or bars 56, 58 are shown which are generally parallel to the longitudinal direction L and equally on opposite sides of the reference L. With such elongate rods or bars, it is no longer necessary to include a remote protuberance 52 of the type shown in FIG. 3. The two bars 56, 58 serve the same function as the button-type pivoting elements shown in FIGS. 2–4. The rods or bars 56, 58 may also be laterally adjustable, as suggested by the holes 54' in the bottom wall 50 (FIG. 5). The rods or bars 56, 58 may also be secured to the bottom wall in a way similar to that suggested in FIG. 4. The fasteners attached to the rod or bar 56 having spaced locking elements 56c, 56d (FIG. 7), which must be forced through the holes 54' by squeezing them together and they subsequently expand on the other side of the wall 50 to retain the pivoting elements. Locking elements, other than those shown in above FIGS. 6 and 7, may be used that operate in a similar fashion but have different constructions. It will be appreciated that numerous locking elements may be used to achieve the similar result.

The keyboard 10 operates on the basis that most of the keys of the keyboard are multi-function keys that can selectively provide one of a number of different signals to be input to a computer concurrent or sequential actuation of the hand and by a finger of the user. As suggested, the switches 46, 48 help to select which of the characters, symbols or functions an individual key will provide as a function of the stable angular position of the keyboard. It will be clear to those skilled in the art that instead of a pivoted housing that pivots about one or two axes between these stable positions, the keyboard 10 can also be slidably mounted on a suitable support for translational movements in a flat plane or even curved plane between two end positions and an intermediate position for both rocking and translational-type keyboards, the end positions can be defined by suitable stops at each end. Intermediate stable positions can be provided by suitable detents, such as ball bearing detents, spring detents or the like. Such detents would be used in view of, for example, the pivoting elements of 40,42 (FIG. 2A) and protuberances 74A, 74B (FIG. 9).

Referring to FIG. 8, an alternate arrangement for the input device is illustrated. The embodiment 60 in FIG. 8 includes a stationary platform 62 provided with support fixed legs 64, 66, which may be in the form of rubber buttons or the like suitable for placement on a support surface S. Provided at the front and rear ends of the platform 62 are upstanding brackets 68, 69 (FIGS. 8,8A). The front bracket 68 is shown provided with diametrically opposing generally vertical arcuate slots 70, 72 as shown. A rocking platform 74, which can either represent the housing of a rocking keyboard, or which can be a supporting keyboard is provided with a pin 76 generally along the longitudinal reference line L and may either represent the rocking keyboard or can be a support for a keyboard, is provided with a pin 76 directed generally along the direction of the longitudinal reference line L. The platform 74 is supported by pivot pins 78, 80 that are generally parallel to the reference line L and respectively protrude thorough the arcuate slot 70, 72. The opposing bracket at the rear end of the platform 66 may similarly be configured to pivotally support the rocking platform 74, as suggested by pivot pins 78', 80', shown in the phantom outline (FIG. 8A). However, as with the button protuberance 52, the rocking platform 74 may be mounted at the remote vertical bracket 69 by means of a single pivot pin 81 generally coextensive with the pin 76. The pin 76, however, does not itself serve as a pivoting point, but, instead serves to secure one end of a tension spring 82, with the other end being secured to the fixed platform 62 itself. In this manner, it will be appreciated that the tension spring 82 urges the rocking platform 74 downwardly in the direction of the fixed platform 62 to bring the pivot pins 78, 80 into abutment against the bottom or lower ends of the arcuate slots 70, 72. Such vertical slots, with the pivot pins 78, 80 positioned at the bottom ends thereof, insure the stable intermediate position or condition of the rocking platform 74 in the neutral or rest condition thereof. Application of a counter-clockwise force on the rocking platform 74 (FIG. 8) will cause the rocking platform to pivot about the stop or pivot pin 78 which will remain at the bottom of the slot 70, while the opposing stop or pivot pin 80 will rise within the arcuate slot 72 until it reaches the upper end of the slot 72. In this condition, the rocking platform will assume the position shown in the phantom outline in FIG. 8. With such an arrangement, selective switching means in the form of switches 46', 48' are provided on the fixed platform 62 at opposing lateral sides A, B to be engaged by the lateral sides of the movable platform as the platform reaches its respective angular end positions. As soon as the hand force is removed form the rocking platform 74, the tension spring 82 will urge the entire platform downwardly, thereby returning the stop or pivot pin 80 from the upper end of the slot 72 to the lower end at which time both stop or pivot pin 78, 80 will again both be positioned at the bottom ends of the slots 70,72 and the rocking platform 74 will again be in a stable state. Similar functions or operations are achieved when the rocking platform 74 is tilted in the opposite direction by application of a clockwise force or moment on the rocking platform. It will be appreciated that even without the spring 82, the rocking platform 74 will tend to move to its stable position due to its own weight. However, the spring 82 serves the additional purpose of keeping the two platforms 62,74 secured together.

Referring to FIG. 9, a generally similar configuration to that shown in FIG. 8 is illustrated in which the brackets 68 with associated slots 70, 72 and bracket 69 are replaced by downwardly depending legs 74a, 74b which are configurated to cooperate with supports 66a, 66b on the fixed platform 62, which are provided with converging surfaces C to minimize the amount of side-to-side or lateral slipping. As with the embodiment 60 shown in FIG. 8 the tension spring 82 normally brings the rocking platform 74 to dispose both the legs 74a, 74b to be positioned on associated supports 66a, 66b. The application of a counter-clockwise force or moment of the rocking on the keyboard 74 causes the leg 74b to rise as shown in FIG. 9, while the entire rocking keyboard 74 pivots about the leg 74a supported on the support 66a. A removal of the external rocking force causes the tension spring 82 to bring both legs 74a, 74b to resting positions on the supports 66a, 66b. Similar action in the clockwise direction would result from a opposing force. Selective switches 46', 48' prime are again positioned to be engaged when the rocking platform reaches one or another angular end pivoted positions.

If desired, any suitable means may be used to adjust the biasing forces applied by the spring 82 (aside from physically changing the springs to ones having different spring constants.) Changing of the biasing forces changes the force by which the movable fixed platforms are drawn towards each other and, therefore, the forces are needed to rock the movable platform 74 from the intermediate or rest position.

While the embodiments in FIGS. 1–9 involve rocking keyboards, namely keyboards that move angularly about one or two pivot axes, it will be evident to those skilled in the art, that similar advantages may be achieved by a keyboard which can be moved from side-to-side in a linear fashion, in which the keyboard is normally in a central neutral position and, against the action of biasing forces, the keyboard is forced to one side or another, such as along a linear track until the keyboard is brought to fixed end positions as which point the appropriate selector switches are engaged. Conceptionally, there is no difference between angular and linear translations, as long as these result in well defined stable end and intermediate positions which result in actuation of appropriate active selector switches when the keyboard is brought to those positions.

Referring to FIG. 10, the layout of one preferred keyboard is illustrated corresponding to the keyboard clusters 24, 26 in FIG. 1. As will be appreciated, the keyboard consists of a set of multi-function keys arranged in a plurality of columns C1–C6 and a plurality of rows, R1–R4. Most of the keys of the keyboard 84a–84c, 84e–84g and 84j–84o are all multi-function alphanumeric, numeric, and symbol keys which can select one of three different alphanumeric letters, numeral, punctuation marks and symbols. The remaining keys 84h, 84i, 84t, 84w, 84x and 84p–84s are essentially computer function keys of the type well known to those skill in the art. Key 84u can be used to enable or disable the operation of the track ball 30. The keyboard has three or more cases: upper, lower and numeric. Each case contains 36 characters. The case switch provide direct access to three cases: capital, numeric and lower, as aforementioned. Additional case switches can be provided to allow typing into languages or to increase the number of available symbols. The track ball 30 can service a case director which allows access to any case by movement of the ball in a preset direction. For example, the thumb may be moved vertically up to establish a capital case and vertically down to establish a lower case. It is evident from the disclosure, that the keyboard may use the selector switches 46, 48 for clicking action in a track ball mode. A command to click the left button is done by rocking the keyboard to the left. Dragging is done by operating the ball to the left keyboard position. To click the fight button, the keyboard is rocked to the right. Touching any other keys switches the keyboard to typing in lower case mode.

Figure 11:
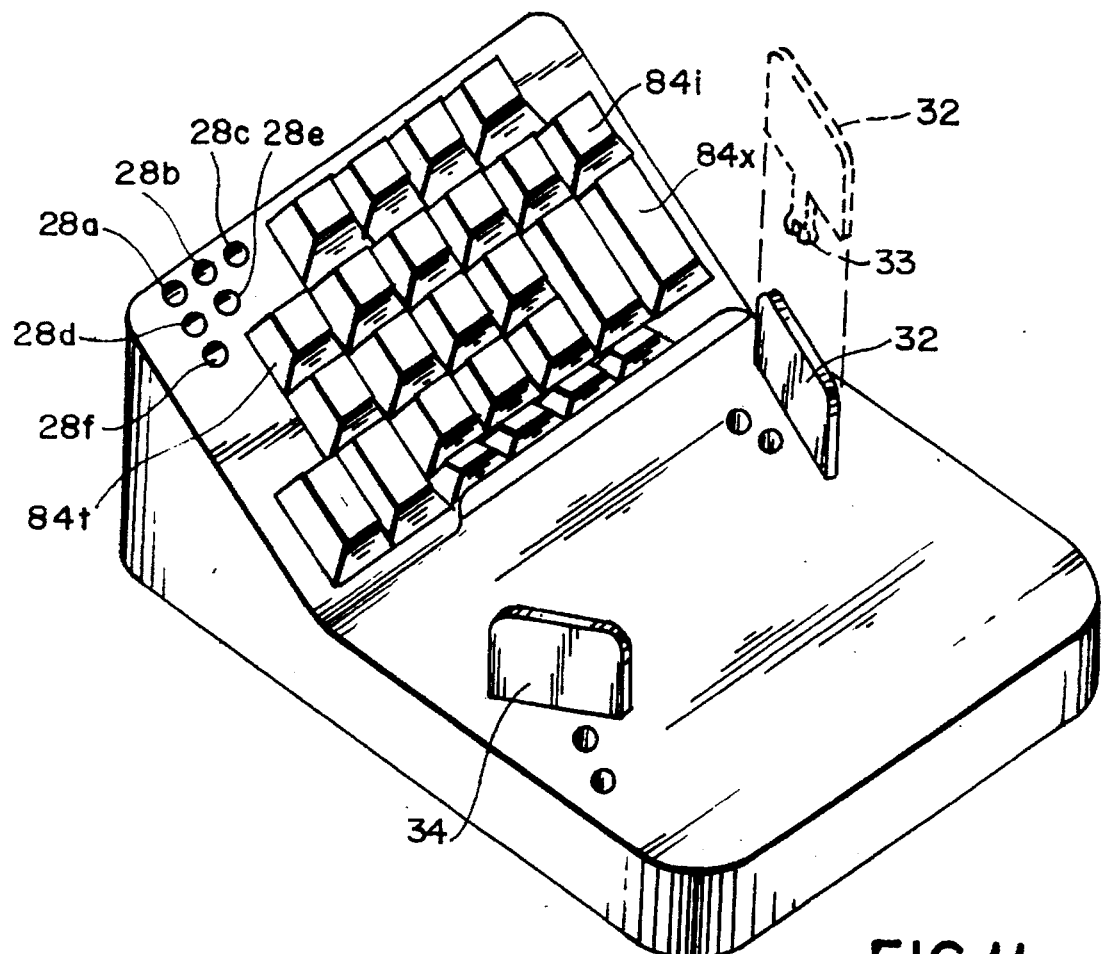
FIG. 11 is similar to FIG. 1, but showing a different arrangement of the keyboard, and also illustrating the removability and adjustability of lateral hand braces for securing the position of the hand on the of a keyboard.
Figure 13A:
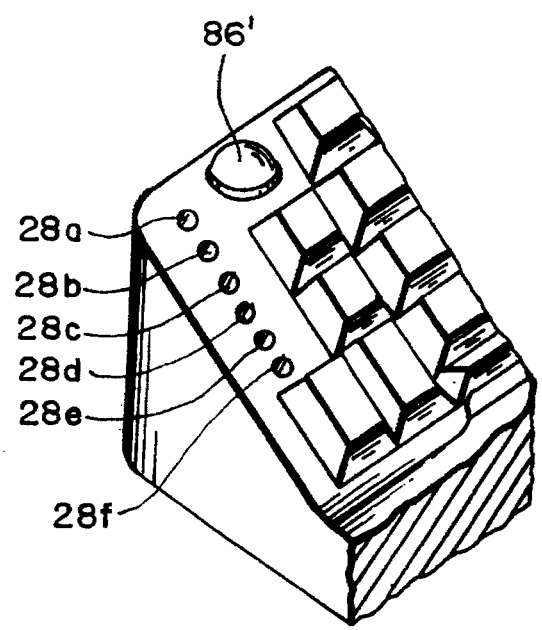
FIG. 13A is a fragmented view of a keyboard of the type similar to the ones illustrated in FIGS. 1-11 but showing a different position of the track ball and a different arrangement of the light indicators.
Figure 12:
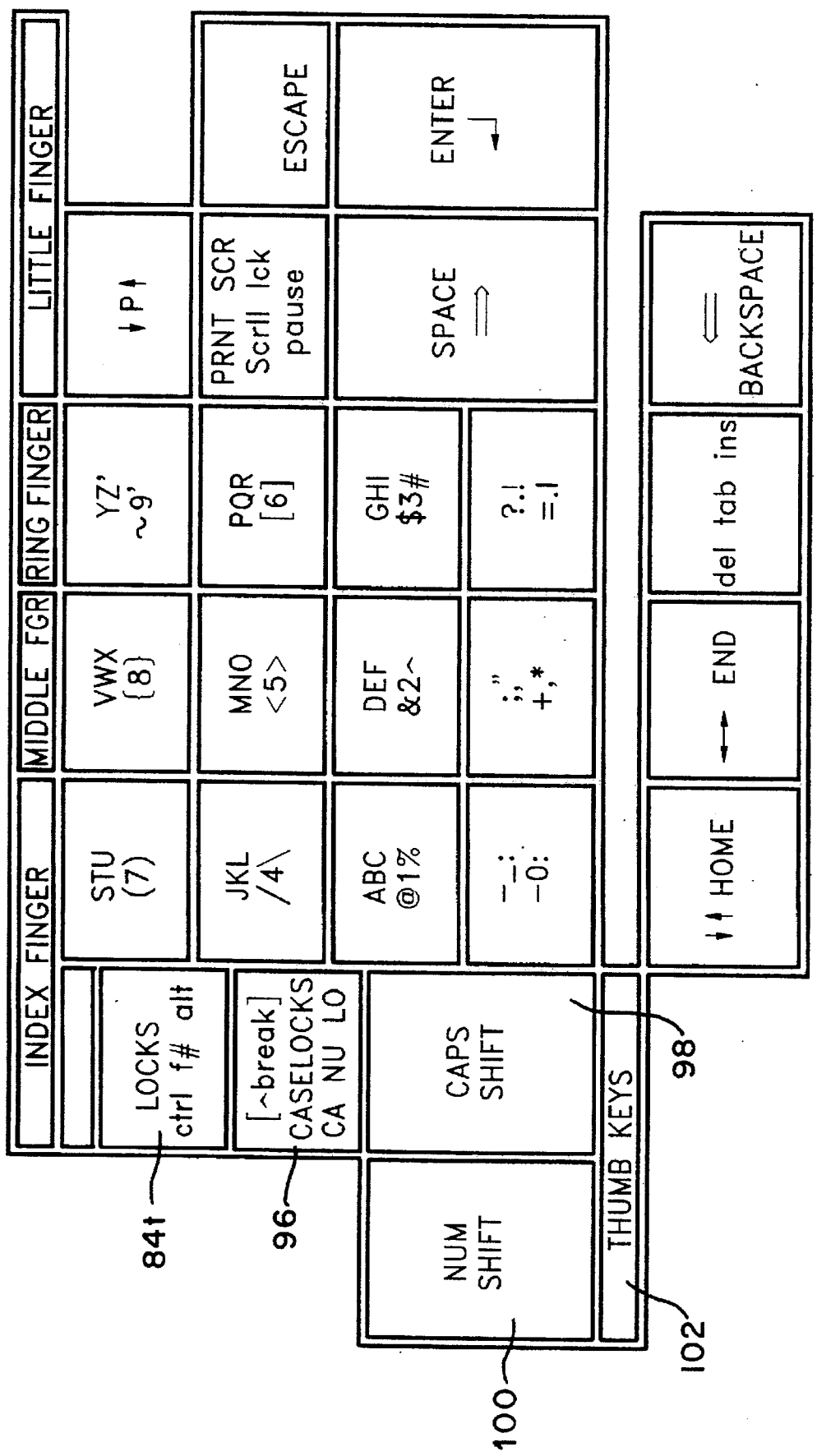
FIG. 12 is similar to FIG. 10, but illustrating the characters and/or functions of the keys employed in the keyboard of FIG. 11.
Figure 13D:
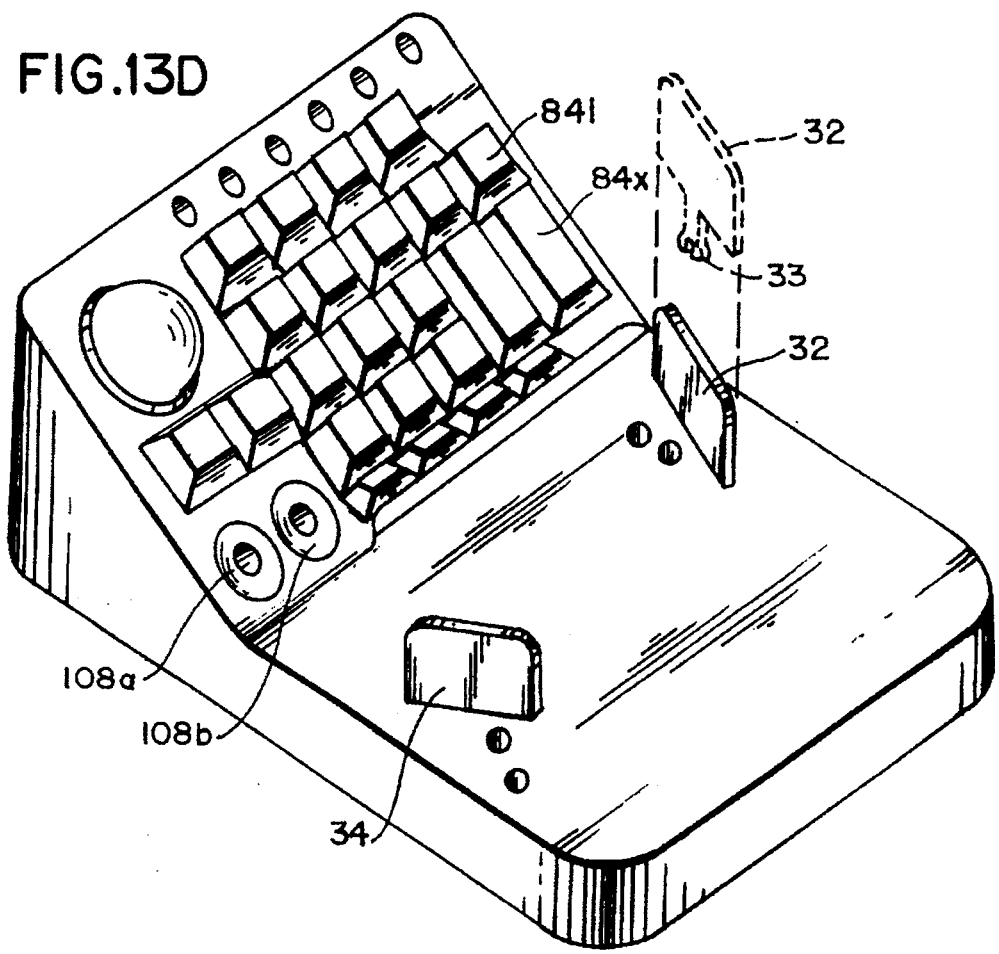
FIG. 13D is similar to FIG. 11 but illustrating a different arrangement of LED display and using the optical sensors of FIG. 13B.
Figure 13C:
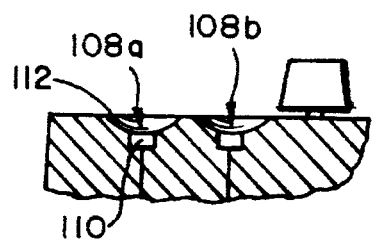
FIG. 13C is a fragmented cross-sectional view of the keyboard shown in FIG. 13B, taken along line 13C, to show the profile of the optical sensors.
Figure 13B:
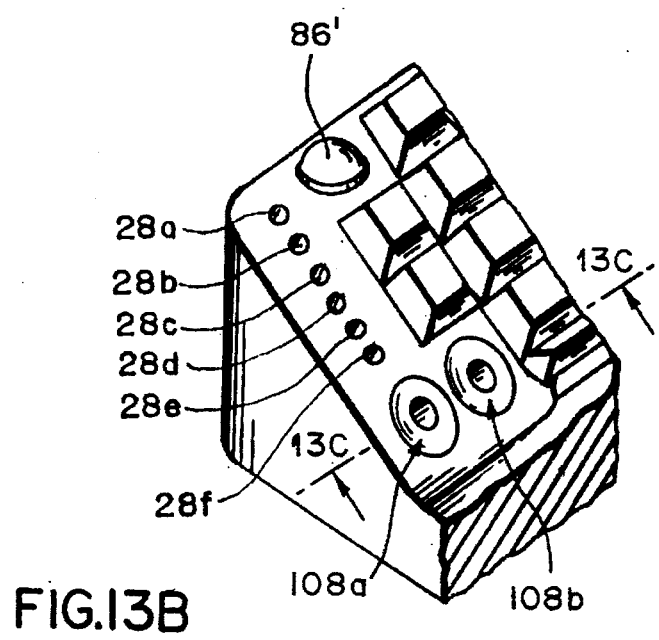
FIGS. 13B is similar to FIG. 13A but illustrating two optical sensors in place of the two mechanical function keys illustrated in FIG. 13A.
Figure 14:
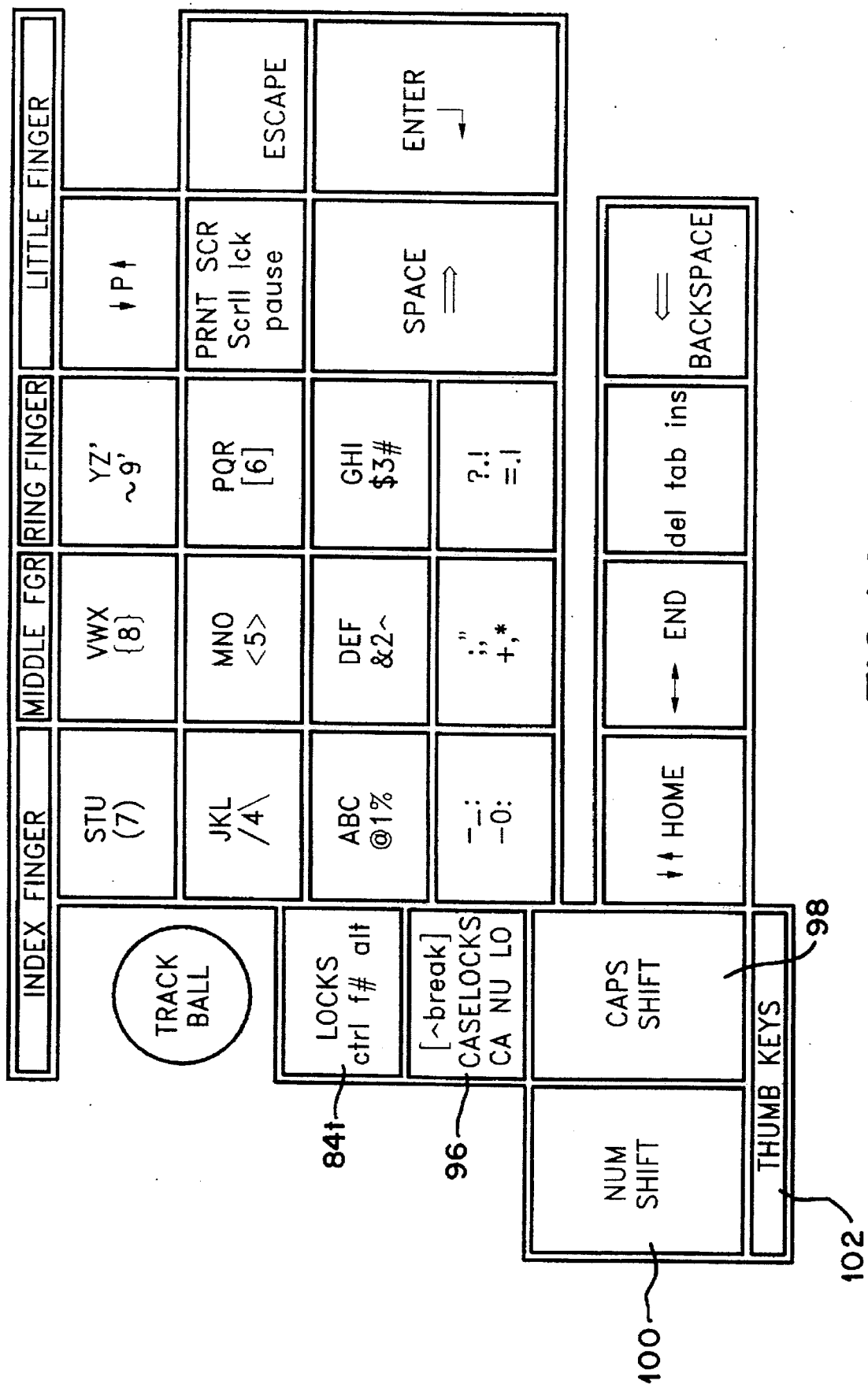
FIG. 14 is similar to FIG. 10 and 12, but illustrates the layout of the keys that can be used in conjunction with the modified keyboard of FIG. 13A.

Alternative key layout designs of rocking keyboards are illustrated in FIGS. 11–14. In FIGS. 11 and 12, an alternate keyboard layout is shown in which the track ball 30 is replaced by the "lock" key 84t and "NUM" and "CAPS" shift keys 98,100. Additionally, the indicators 28a–28f have been rearrange from linear arrangement to an angular arrangement. FIG. 11 also illustrates one of the bracing retainers 32 both in the mounted position (in solid) and the removed position (in outline) for changing the position on the surface 16. In FIGS. 13 and 14, the keyboard key layout has again been slightly modified and the track ball 30 has been moved from the lower end of the inclined surface 20 to upper end thereof at 86'. The keyboard layout as shown in FIG. 14 is very similar to one shown in FIG. 12 with the exception that the track ball has been positioned as aforementioned.

All of the embodiments utilizing a track ball may be arranged to work as to typical track balls, except that the clicking action is activated by the rocking switches under the button of the keyboard. Rocking to the right substitutes the left bottom, and rocking to the right substitutes for the fight button. The clicking mode is thereby switched on by touching the ball and switched off by touching of any of the keys. When used as a ball director, the ball director allows the selection of the character from the needed case (capital, numeric, lower or custom) by the movement of the ball in the preset direction. The track ball mode is switched on by pressing on the ball switch and switched off by pressing on any other key. The clicking action is similar to the previous design and activated by rocking of the keyboard.

A more detailed discussion of the selection of one of a number of different functions with a multi-function key by rocking action of the keyboard is described in U.S. Pat. No. 4,846,596 issued to applicant of the present application.

While specific embodiments have been described in detail, there is to be understood that various modifications thereof, other than those suggested may be made in accordance with the present invention, which is defined by the appended claims.

In FIG. 2C, an alternate embodiment is shown which includes light sensitive means for optically detecting when the housing reaches one of the end positions. The bottom wall or surface of the housing includes a central flat surface 104a generally parallel to the hand supporting surface 16. Upwardly inclined surfaces 104b, 104c diverge from the central surface 104a as shown. An optical sensor 106a is mounted on the surface 104b and an optical sensor 106b is mounted on the surface 104c. When the keyboard is rocked in a clockwise direction, the surface 104c is brought into abutment with the support surface S so as to block out light to the sensor 106b. Similarly, when the keyboard is rocked in a counterclockwise direction, light is blocked to the sensor 106a. Only when the keyboard rests on the central surface 104a, do both sensors 106a, 106b receive light. The sensors 106a, 106b can serve as selector switches.

Referring to FIGS. 13B–13D, another modification is illustrated in which two finger actuated function keys 108a, 108b are used that are in the form of light sensitive elements 110 for optically detecting a tip of a finger. Each element replaces a mechanical key switch. However, each light sensitive element 110 is advantageously recessed in the surface of the housing and requires no mechanical movement. Preferably, a concave depression or recess 112 is provided as shown in to better index the position of the elements 110 and insure that light is fully blocked when the tip of the user's finger is received within a depression or recess 112. The use of recessed elements 110 of the type shown increases the reliability of the unit and facilitates the actuation of such function keys since the thumb, in this case, needs only be moved essentially in lateral directions substantially within a single plane, as opposed to moving in a three-dimensional space in the case of conventional key switches. This makes it much easier, quicker and less tiring to use the keyboard.

Although the invention has been described in its preferred form with a certain degree of particularity, it is understood that the present disclosure of the preferred form can be changed as to the details of construction and the combination and arrangement of parts may be modified without departing from the spirit and the scope of the invention as hereinafter claimed.

What is claimed is:

1. A single-hand controller keyboard comprising a movable housing having remote and proximate portions relative to the position of the user of the input device, said proximate portion forming a hand supporting surface suitable for placement of the palm of a user and defining a longitudinal reference line generally parallel to the direction of the hand and fingers of the user when the hand is supported on said proximate portion during use of the input device; moving means for moving said housing between three stable positions including two end positions and one intermediate position relative to said reference line and for normally maintaining said housing in said stable intermediate position substantially midway between said two end positions, said moving means comprising rocking means for rocking said housing about at least one pivot axis between two angular end positions relative to aid pivot axis and for normally maintaining said housing in a generally stable position substantially midway between said two angular end positions, said hand-actuated selector switch means selecting one of the functions and associated signals for each of said angular positions of said movable housing about said axis; at least one finger-actuated multi-function means on said remote portion capable of selectively generating one of a number of different signals to be inputted to a computer upon actuation by a finger of the user; and hand actuated selector switch means for selecting one of the functions and associated signals of a selected multi-function means for each of said stable positions of said housing, said at least one finger-actuated multi-function means including a cluster of actuatable character keys mounted on said remote portion and being actuatable by the tips of the fingers of the user, each of said character keys serving as a separate finger actuated multi-function means representing a plurality of alpha-numeric characters and/or symbols that can be inputted to a computer by initial pre-selective rocking movement of said housing by the movements of one hand to actuate said hand-actuated selector switch means and subsequent selective actuation of said character keys by movements of the fingers.

2. An input device as defined in claim 1, wherein said finger-actuated multi-function means includes a cluster of function keys on said housing actuatable by the tips of the fingers of the user, at least one of the function keys serving as a separate multi-function means representing a plurality of functions that can be inputted to a computer by initial preselective rocking movements of said housing by movements of one hand and subsequent selective actuation of at least one of said function keys by movement of the fingers.

3. An input device as defined in claim 1, wherein at least one of said finger-actuated multi-function means comprises a cursor pointing device mounted on said remote portion of said housing proximate to said clusters of keys.

4. An input device as defined in claim 1, wherein said finger-actuated multi-function means comprises a multi-function ball mounted on said housing.

5. An input device as defined in claim 1, wherein said housing includes an opposing surface to said hand supporting surface, said moving means comprising a pair of protuberance means on said opposing surface suitable for being placed on a support surface and defining two spaced elongate pivoting axes each extending generally along the direction of said reference line and substantially equally laterally offset to opposite sides of said reference line, said normal stable intermediate position being achieved when said housing is positioned with both protuberance means abutting against the supporting surface, said hand-actuated selector switch means comprising a pair of switches each mounted on said opposing surface laterally exteriorly of each associated protuberance means and actuated when said housing is pivoted on the support surface about an associated protuberance means to one of said angular end positions.

6. An input device as defined in claim 5, wherein each protuberance means comprises at least one supporting leg defining a pivoting axis generally parallel to said reference line.

7. An input device as defined in claim 6, further comprising means for selectively positioning said legs at selected lateral spacings relative to said reference line for changing the spacing between said legs and thereby changing the level of stability of said housing in said intermediate position.

8. An input device as defined in claim 2, further comprising indicator means on said remote portion for providing an indication of at least one of the selected functions.

9. An input device as defined in claim 1, further comprising retainer means on said hand supporting surface for retaining the hand of the user in a selected position for minimizing movements of the hand on said hand supporting surface relative to a selected optimum position.

10. An input device as defined in claim 9, wherein said hand retainer means comprises a pair of braces movably mounted on said hand supporting surface to be positionable in a plurality of relative positions to accommodate different sizes of the hand of the user.

11. An input device as defined in claim 1, wherein said moving means comprises a stationary platform adapted to be positioned on a working support surface; and pivoting means for pivotally mounting said housing on said platform about said at least one pivot axis.

12. An input device as defined in claim 11, wherein said stationary platform is provided with spaced upright support brackets at least one of which is provided with diametrically opposing generally vertical arcuate slots; spaced pivot pins being mounted on said housing and extending through associated arcuate slots to provide said stable intermediate position where said spaced pivot pins are both supported at lower ends of said arcuate slots most proximate to said stationary platform.

13. An input device as defined in claim 11, further comprising protuberances downwardly projecting from said housing in a direction away from said hand supporting surface, said protuberances being laterally spaced on opposite sides of said reference line and arranged to contact said stationary platform to provide stability of said housing on said stationary platform in the stable intermediate position.

14. An input device as defined in claim 11, further comprising biasing means for urging said housing towards said stationary platform to insure controlled tension of rocking by regulating the biasing applied by said biasing means as well as restoring the stable intermediate position of said housing when no external rocking forces are applied to said housing.

15. An input device as defined in claim 14, further comprising adjusting means for adjusting the biasing forces applied by said biasing means.

16. An input device as defined in claim 2, wherein said remote portion comprises a first inclined surface facing the user and a proximate second inclined surface facing away from the user, said inclined surfaces defining a generally V-shaped configuration; and at least some of the keys being arranged on both said first and second inclined surfaces.

17. An input device as defined in claim 1 wherein the device comprises a trackball mounted for rotation on said proximate portion of said housing for providing a plurality of functions by selective rotation of the ball; said hand-actuated selector switch means serving to select at least one function in each of said two angular end positions of said housing.

18. An input device as defined in claim 3, wherein said multi-function ball is programmed to provide case selection functions by selective rotation of said multi-function ball.

19. An input device as defined in claim 1, wherein said hand-actuated selector switching means includes light sensitive detecting means for optically detecting when said housing reaches each of said stable positions.

20. An input device as defined in claim 1, wherein at least one of said finger-actuated multi-function means includes light sensitive switching means responsive to the position of a finger.

21. A single-hand controller computer input device comprising a movable housing having remote and proximate portions relative to the position of the user of the input device, said proximate portion forming a hand supporting surface suitable for placement of the palm of a user and defining a longitudinal reference line generally parallel to the direction of the hand and fingers of the user when the hand is supported on said proximate portion during use of the input device; moving means for moving said housing between three stable positions including two end positions including two end positions and one intermediate position relative to said reference line and for normally maintaining said housing in said stable intermediate position substantially midway between said two end positions, said moving means comprising rocking means for rocking said housing about at least one pivot axis between two angular end positions relative to said pivot axis and for normally maintaining said housing in a generally stable position substantially midway between said two angular end positions, said hand-actuated selector switch means selecting one of the functions and associated signals for each of said angular positions of said movable housing about said axis; at least one finer-actuated multi-function means on said remote portion capable of selectively generating one of a number of different signals to be inputted to a computer upon actuation by a finer of the user; and hand-actuated selector switch means for selecting one of the functions and associated signals of a selected multi-function means for each of said stable positions of said housing, wherein said finger-actuated multi-function means comprising a multi-function ball mounted on said housing for providing different functions to the computer based upon the rocking positions of said housing.

* * * * *